United States Patent [19]
Williams et al.

[11] Patent Number: 6,055,578
[45] Date of Patent: *Apr. 25, 2000

[54] APPARATUS AND METHOD FOR SELECTIVELY CONTROLLING TRANSMISSION OF CONSECUTIVE PACKETS IN A NETWORK STATION

[75] Inventors: Robert Alan Williams, Cupertino; Mohan Kalkunte, Sunnyvale, both of Calif.

[73] Assignee: Advanced Micro Devices, Inc., Sunnyvale, Calif.

[*] Notice: This patent is subject to a terminal disclaimer.

[21] Appl. No.: 08/872,017

[22] Filed: Jun. 9, 1997

Related U.S. Application Data

[63] Continuation-in-part of application No. 08/698,102, Aug. 19, 1996.

[51] Int. Cl.⁷ ................................ G06F 13/00
[52] U.S. Cl. ........................... 709/253; 395/856
[58] Field of Search .................... 370/473, 448, 370/231; 709/235, 238, 253; 395/856

[56] References Cited

U.S. PATENT DOCUMENTS

| | | |
|---|---|---|
| 5,319,641 | 6/1994 | Fridrich et al. . |
| 5,353,287 | 10/1994 | Kuddes et al. . |
| 5,404,353 | 4/1995 | Ben-Michael et al. . |
| 5,418,784 | 5/1995 | Ramakrishnan et al. . |
| 5,422,887 | 6/1995 | Diepstraten et al. . |
| 5,436,903 | 7/1995 | Yang et al. . |
| 5,526,355 | 6/1996 | Yang et al. . |
| 5,642,360 | 6/1997 | Trainin . |
| 5,673,254 | 9/1997 | Crayfors ............................. 370/231 |
| 5,737,531 | 4/1998 | Ehley ................................. 709/208 |
| 5,784,375 | 7/1998 | Kalkunte et al. ................... 370/448 |
| 5,812,554 | 9/1998 | Kadambi et al. ................... 370/473 |
| 5,852,723 | 12/1998 | Kalkunte et al. ................... 709/235 |
| 5,854,900 | 12/1998 | Kalkunte et al. ................... 709/238 |
| 5,894,559 | 4/1999 | Krishna et al. ..................... 709/253 |

FOREIGN PATENT DOCUMENTS

| | | |
|---|---|---|
| 0632619 A2 | 4/1995 | European Pat. Off. . |
| 0632620 A2 | 4/1995 | European Pat. Off. . |
| 0632621 A2 | 4/1995 | European Pat. Off. . |

OTHER PUBLICATIONS

AMD, AM79C970 PCnet™–PCI Single–Chip Ethernet Controller for PCI Local Bus, Jun. 1994, pp. 1–868— 1–1033.

Comer, D.E. et al., "A Rate–Based Congestion Avoidance and Control Scheme for Packet Switched Networks," Proceedings of the International Conference on Distributed Computing Systems, Paris, May 28–Jun. 1, 1990, Conf. 10, May 28, 1990, IEEE, pp. 390–397.

(List continued on next page.)

*Primary Examiner*—Frank J. Asta
*Assistant Examiner*—Thong Vu

[57] ABSTRACT

Delay times are modified in an Ethernet network device having captured the media channel by increasing the interframe spacing (IFS) between data packets. The modified IFS interval, increased by adding a delay interval to the minimum interpacket gap (IPG) interval after a first user-selectable number of consecutive successful transmissions, enables other network stations to transmit data during the deferral interval. The Ethernet network device maintains the modified IFS for a limited deferral interval, based upon a predetermined time interval, a number of successful transmissions by other network stations, or a second user-selectable number of consecutive successful transmissions. Additional delay intervals may be added if the network station continues to exceed the predetermined number of consecutive successful transmissions. Burst transmission can also be optimized by counting the consecutive successful transmissions only after detecting an attempted transmission by another network station. Hence, a network station can avoid capturing a network channel while ensuring access latencies.

22 Claims, 11 Drawing Sheets

OTHER PUBLICATIONS

Williamson, C.L. et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.-

APPARATUS AND METHOD FOR SELECTIVELY CONTROLLING TRANSMISSION OF CONSECUTIVE PACKETS IN A NETWORK STATION

CROSS-REFERENCE TO RELATED APPLICATIONS

This application is a continuation-in-part of copending application Ser. No. 08/698,102, filed Aug. 15, 1996, entitled APPARATUS AND METHOD FOR SELECTIVELY REDUCING CAPTURE EFFECT IN A NETWORK STATION (attorney docket 1033-164).

BACKGROUND OF THE INVENTION

1. Field of the Invention

The present invention relates to network interfacing and more particularly, to methods and systems for transmitting consecutive packets between two stations.

2. Description of the Related Art

Local area networks use a network cable or other media to link stations on the network. Each local area network architecture uses a media access control (MAC) enabling network interface cards at each station to share access to the media.

The Ethernet protocol as modified by ISO/IEC 8802-3 (ANSI/IEEE Std. 802.3, 1993 edition) defines a half-duplex media access mechanism that permits all stations to access the network channel with equality. Each station includes an Ethernet interface controller that uses carrier-sense multiple-access with collision detection (CSMA/CD) to listen for traffic on the media. Transmission by a station begins after sensing a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined transmission delay interval after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j=3, then the range of randomly selected time slots is (0,7); if the randomly-selected number of time slots is four, then the collision backoff interval will be equal to four slot time intervals. According to Ethernet protocol, the maximum range of randomly selected time slots is $2^{10}-1$.

The truncated binary exponential algorithm has the disadvantage that the range of randomly selected time slots (0, $2^j-1$) increases exponentially each time a specific station loses a retry attempt after collision, resulting in a higher probability that during the next collision mediation the station will randomly select a larger integer multiple of time slots and lose the next collision mediation. Thus, a new station that has data to transmit has a higher probability of winning a collision mediation than the station having a greater number of attempts. This effect is known as the capture effect, where a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot easily be supported on half-duplex networks.

The capture effect also may occur between Ethernet/IEEE 802.3 network stations having different capabilities in counting the transmission delay interval before attempting access of the media. Ethernet protocol specifies the transmission delay interval after sensed deassertion of the receive carrier, i.e., the interpacket gap (IPG) interval, as having a minimum value before stations can attempt access of the media. Network stations (i.e., network nodes) that are capable of minimizing the transmission delay to the IPG interval, referred to as "fast nodes" or "dominant stations", will begin to transmit before stations incapable of achieving the minimum IPG interval, referred to as "slow nodes". In other words, hardware limitations may prevent the slow nodes from accessing the media within the time interval defined by the IPG interval. Hence, dominant network stations will tend to capture the media over slower nodes that wait a longer time before attempting access of the media. These slower nodes encounter a surrender effect, in which they "surrender" their access to the media due to hardware limitations. The surrender effect may create substantial throughput problems in transmission protocols requiring a sender to receive an acknowledgement within a prescribed interval after a burst transmission.

The surrender effect may also occur due to the position of a network station within a network topology. For example, if two stations are connected to a repeater at different distances, the one station closer to the repeater will have less of a propagation delay, enabling that one station to capture the media, especially if the closer station is also a faster node. Hence, the station further from the repeater will suffer the surrender effect, incapable of accessing the media.

Hence, capture effect may be caused by a station encountering a large number of collisions, variance in IPG access times between fast and slow nodes, and variations in propagation delay. The capture effect thus causes a large variance in the network access latency, and a corresponding large variance in end to end delays experienced by data packets.

DISCLOSURE OF THE INVENTION

There is a need for a method of accessing media of a packet switched network that provides fair access to all the nodes.

There is also a need for a method of accessing media of a packet switched network that increases the network throughput under heavy traffic loads.

There is also a need for a method of accessing media of an Ethernet network that minimizes the occurrence of the capture effect.

There is also a need for an arrangement for accessing the media of a half-duplex shared network that provides bounded packet access latencies.

There is also a need for a method of accessing media of a shared network, where network stations having minimal propagation delays or an ability to access the media after the minimum interpacket gap (IPG) interval do not capture the media from other network stations.

There is also a need for an arrangement that optimizes network throughput in protocols requiring periodic acknowledgements from a receiving station by granting the receiving station intervals to transmit an acknowledgement to a transmitting station dominating the media.

There is also a need for a method of accessing media of a shared network, where a station capturing the media is able to selectively release control of the media to other network stations without a substantial reduction in the station burst throughput.

These and other needs are attained by the present invention, where the delay time between sensing a deassertion of the receive carrier on the media and attempting access of the media is modulated in a network station, based on the number of successful consecutive transmissions completed by the network station and prescribed thresholds that ensure unnecessary delays are not introduced.

According to one aspect of the present invention, a method of accessing network media by a network station includes enabling a counter in response to detection of a transmission attempt by a second network station on the network, where the counter is configured to count a number of consecutive successful transmissions by the network station. The method determines if the counted number of consecutive successful transmissions exceeds a first prescribed threshold, and increases a delay time to include a predetermined interpacket gap interval and an additional time interval if the number exceeds the first prescribed threshold. The method senses deassertion of a receive carrier on the media, waits the delay time in response to the sensed deassertion of the receive carrier, and attempts access of the media by the network station after the sensed deassertion of the receive carrier and the delay time.

The enabling of the counter in response to detection of a second network station ensures that network throughput is optimized by avoiding the end reduction of unnecessary delays. Specifically, the copending application Ser. No. 08/698,102 provides an arrangement for avoiding capture effect by adding an additional time interval when the number of consecutive successful transmissions exceeded a predetermined threshold. The enabling of the counter according to the present invention ensures that the delay time between consecutive transmissions is not increased until necessary, for example when the network station has actually captured the media from a second station contending for access to the network.

Another aspect of the present invention provides a method of accessing the media, comprising setting a first threshold specifying a maximum number of consecutive successful transmissions by the network station interleaved with a first minimum delay interval, setting a second threshold specifying a maximum number of consecutive successful transmissions by the network station interleaved with a second delay interval greater than the first minimum delay interval, counting the number of consecutive successful transmissions of data packets by the network station, and selectively delaying transmission of another packet for one of the first and second delay intervals based on the counted number of consecutive successful transmissions and the first and second thresholds. Setting of the first and second thresholds provides flexibility in avoiding capture effect while maintaining high burst throughput for different network topologies. In addition, the selective delay enables a network station to operate in a fast burst throughput mode or a slow burst throughput mode, where the network station may switch between the two modes based upon the set threshold in order to provide sufficient time for another station to access the media, without substantial reduction in burst throughput by the transmitting station.

Hence, the present invention provides a flexible arrangement for modifying the delay time between consecutive packet transmissions when a network station is operating in a burst mode. The network station can be optimized for a two-node situation, for example according to a sliding window protocol, or a multi-station case, where the transmitting station may contend with many different stations for access for the media. Moreover, the invention enables network devices to have backwards compatibility with older devices that are subject to surrender effect.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

Reference is made to the attached drawings, wherein elements having the same reference numeral designations represent like elements throughout and wherein.

BEST MODE FOR CARRYING OUT THE INVENTION

Figure 1:
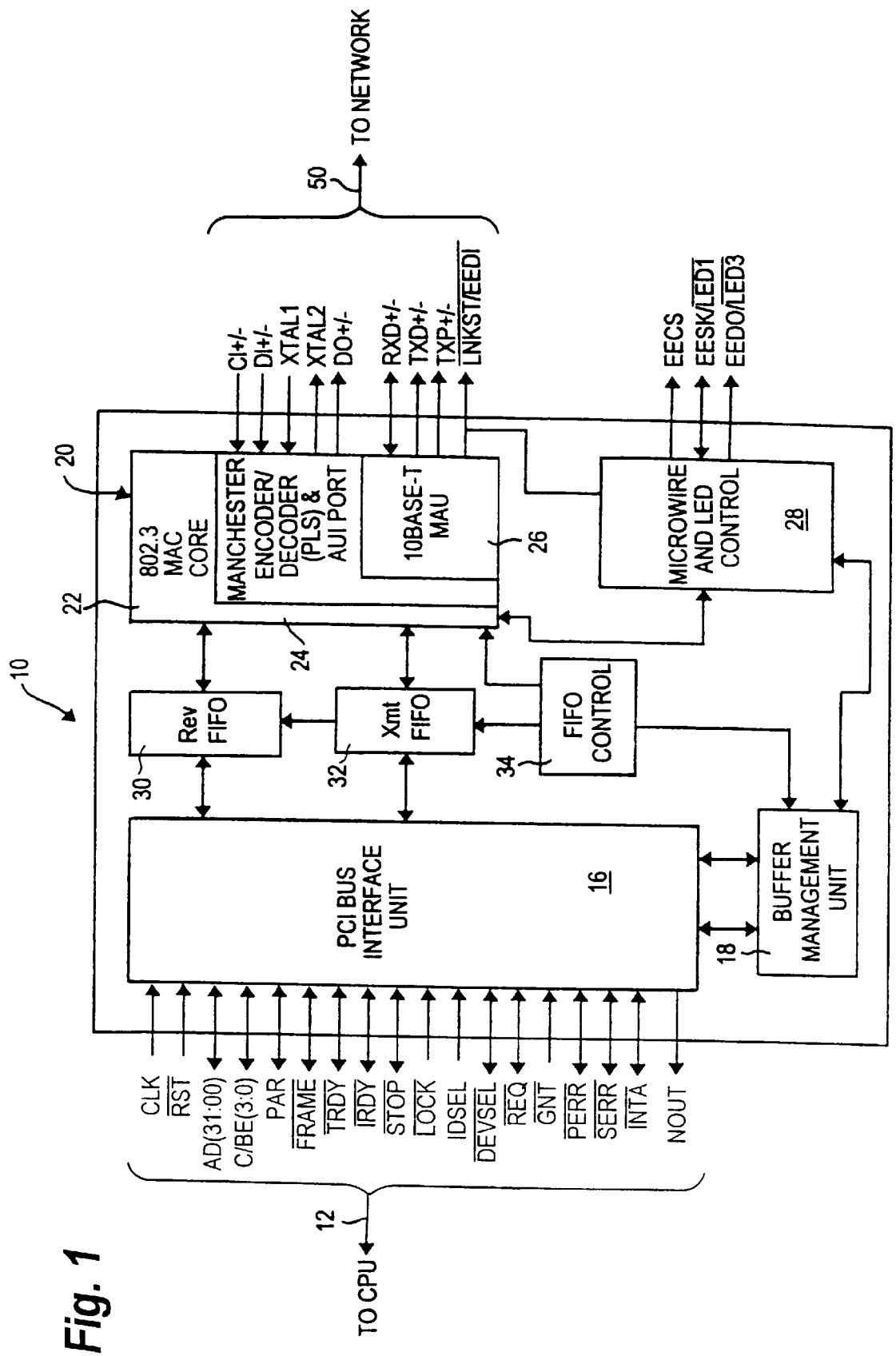
FIG. 1 is a block diagram of a network interface according to an embodiment of the present invention.

FIG. 1 is a block diagram of an exemplary network interface 10 that accesses the media of a packet switched network such as an Ethernet (ANSI/IEEE 802.3) network according to an embodiment of the present invention, resulting in avoidance of capture effect, increased throughput on the network during heavy traffic, and no collisions. The network interface 10 can be configured to modify the delay time for accessing the media, as described below with respect to the first, second, and third embodiments.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet™-PCI Single-Chip Ethernet Controller for PCI Local Bus from Advanced Micro Devices, Inc., Sunnyvale, Calif., disclosed on pages 1-868 to 1-1033 of the AMD Ethernet/IEEE 802.3 Family 1994 World Network Data Book/Handbook.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a Microwire™ EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's memory via the PCI bus 12. The PCI bus interface unit 16, under the control of the DMA buffer management unit 18, receives transfers from the host computer memory via the PCI bus 12. The data frames received from the PCI bus interface unit 16 are passed to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 and the MAU 26 each include circuits that sense idle to non-idle transitions on the media 50, as specified in Ethernet (ANSI/IEEE 802.3) protocol. For example, the AUI serves as an interface between the physical layer (PHY) and the Physical Layer Signaling (PLS) implemented in the interface 10. The detection of activity on the media 50 is performed by the physical layer, which asserts a valid receive data indication to the MAC 22 layer in response to the detection and decoding of the preamble of a received data packet. Hence, the term activity on the media refers to reception or transmission of valid data. The sensed deassertion of the receive carrier occurs when the physical layer determines that the media 50 transitions from a nonidle to an idle state. The AUI 24 detects a collision by the CI inputs, and the MAU 26 detects a collision by sensing activity on both twisted pair signals RXD and TXD.

Figure 2A:
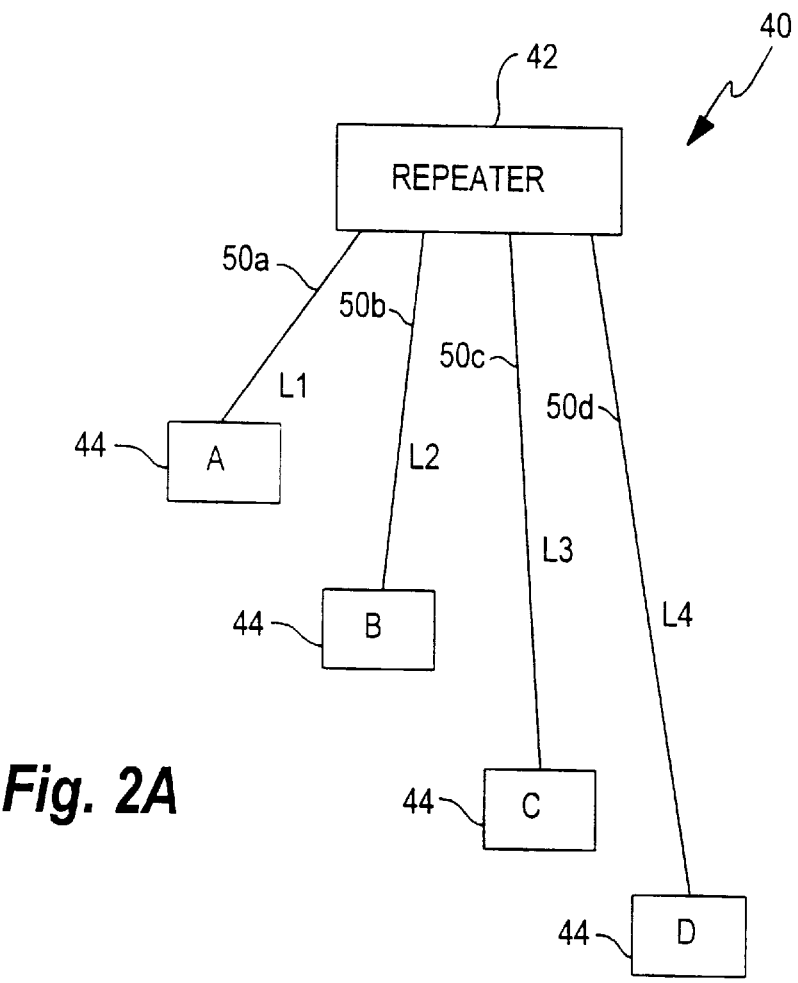
FIGS. 2A and 2B are diagrams illustrating exemplary layouts of a packet switched network.

FIG. 2A is a diagram illustrating a network 40 having a repeater 42 connecting four network stations 44 by the media 50. The media 50 may be either coaxial, fiber optic, or twisted pair wire, and hence may couple the interface 10 to 10BASE-T, 10BASE-2, 100BASE-TX, 100BASE-T4, or 100BASE-FX networks. The network 40 may operate at 10 megabits per second (10 Mbit/s), 100 megabits per second (100 Mbit/s), or 1000 megabits per second (1000 Mbit/s). The station A is connected to the repeater 42 by media cable 50a having a length L1, and the remaining stations B, C, and D are connected to the repeater 42 by cables 50b, 50c, and 50d having respective lengths L2, L3, and L4.

As shown in FIG. 2A, the cables have relative lengths L1<L2<L3<L4. Hence, station A has the lowest propagation delay for signals sent and received by the repeater 42, and station D has the highest propagation delay. The minimal propagation delay (L1) provides station A the advantage of sensing deassertion of a receive carrier on the media 50a before the stations B, C, and D sense the deassertion on the respective media cables 50b, 50c, and 50d. Since station A encounters the minimum propagation delay, station A has the greatest probability of capturing the media channel if it is the only node capable of switching from receive mode to transmit mode within the minimum IPG. In such a case, station A is considered the dominant station, or the fast node, because it has the greatest probability of capturing the media channel.

Figure 2B:
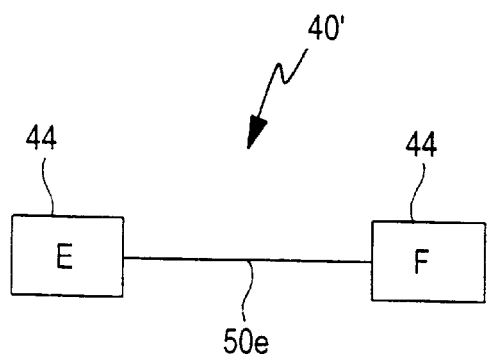

FIG. 2B is a diagram illustrating an alternate network 40' having two stations 44 connected by a media cable 50e to form a network. Network 40' illustrates the configuration of a client-server arrangement, where the client station E receives relatively large amounts of data from the server station F. Hence, the station F will tend to be fairly active, as opposed to client station E, which will tend to send relatively small data packets containing requests and acknowledgements to the server F. The parent application Ser. No. 08/698,102 described arrangements to minimize the capture effect by temporarily reprogramming in the dominant station the delay timer to wait an IFS interval greater than the predetermined interpacket gap (IPG) interval when the dominant station has successfully transmitted a predetermined consecutive number of data packets. These arrangements of the parent application are described below as the first embodiment with respect to FIGS. 3–5. Resetting the delay time results in a larger interframe spacing in the dominant station (e.g., server station F), enabling another station (e.g., client station E) to access the media.

One aspect of the present invention provides improvements to the arrangements to minimize the capture effect disclosed in the parent application Ser. No. 08/698,102 by deferring actual use of the increased delay time until an actual capture effect condition has been detected. For example, the server station F of FIG. 2B may be capable of transmitting files on the order of gigabits to the client station E by successive bursts of a plurality of packets (i.e., frames). In this scenario, burst throughput would be reduced if the server station F unnecessarily increased the delay time to enable the client station E to access the network media 50e, especially if the client station E did not need to actually access the media.

Hence, one aspect of the present invention enables a consecutive station transmit counter (CST) in response to detection of a transmission attempt by a second network station. The increase in the interframe spacing (i.e., the delay interval between consecutive packets) in the dominant station is deferred until detection by the dominant station of a transmission attempt by the second network station, for example a detected collision, in order to avoid introducing unnecessary delays into the interframe spacing of the dominant station. Hence, the burst throughput of the dominant station is maximized, while at the same time enabling the dominant station to defer to another station when necessary. These features are described below with respect to the second embodiment of FIGS. 6A and 6B.

Another aspect of the present invention enables a user to set first and second thresholds, where the first threshold specifies a maximum number of consecutive successful transmissions by the dominant station interleaved with the minimum interpacket gap (IPG) delay interval and the second threshold specifying a maximum number of consecutive successful transmissions by the dominant station interleaved with a second delay interval greater than the minimum IPG delay interval. Once the thresholds have been set, the transmitting station counts a number of consecutive successful transmissions of data packets by the network station, and selectively delays transmission of another packet using either the first or second delay intervals based on the countered number of consecutive successful transmissions relative to the first and second thresholds. Hence, a dominant station will transmit in a fast throughput mode and a slow throughput mode, where the first threshold defines the number of consecutive data packets transmitted using the fast throughput mode, and the second threshold specifies the number of consecutive data packets transmitted under the slow throughput mode. These features are described below with respect to the third embodiment in FIG. 8.

Hence, the arrangement for alternating between a fast throughput mode and a slow throughput mode in a transmitting station is particularly useful for two-node situations such as the two-node network in FIG. 2B, where the server station may capture the network after the client encounters repeated collisions. Moreover, the two-speed transmission sequence is particularly useful for transmission control protocols, for example TCP sliding window protocol, where a transmitting station will halt transmission if an acknowledgement frame has not been received after transmission of a prescribed number of packets, described in detail below. The two-speed transmission sequence is also particularly helpful in overcoming the problems associated with surrender effect, where a network station is not fast enough to switch from a receive mode to a transmit mode within the interpacket gap interval. Hence, use of the two-speed transmission is particularly advantageous with respect to backwards compatibility in existing networks having slower network stations. The disclosed embodiments also provide bounded access latencies by resetting the IFS delay intervals to the minimum IPG after a predetermined deferral interval. Examples of applications requiring bounded access latencies include multimedia applications transporting video and audio data in real time or near-real time.

Hence, the present invention enhances the arrangements disclosed in the parent application Ser. No. 08/698,102 to provide greater flexibility for different applications. A description of the first embodiment for minimizing capture effect will first be described as disclosed in the parent application, followed by a description of the improvements in selectively reducing channel capture according to the second and third embodiments.

Figure 3:
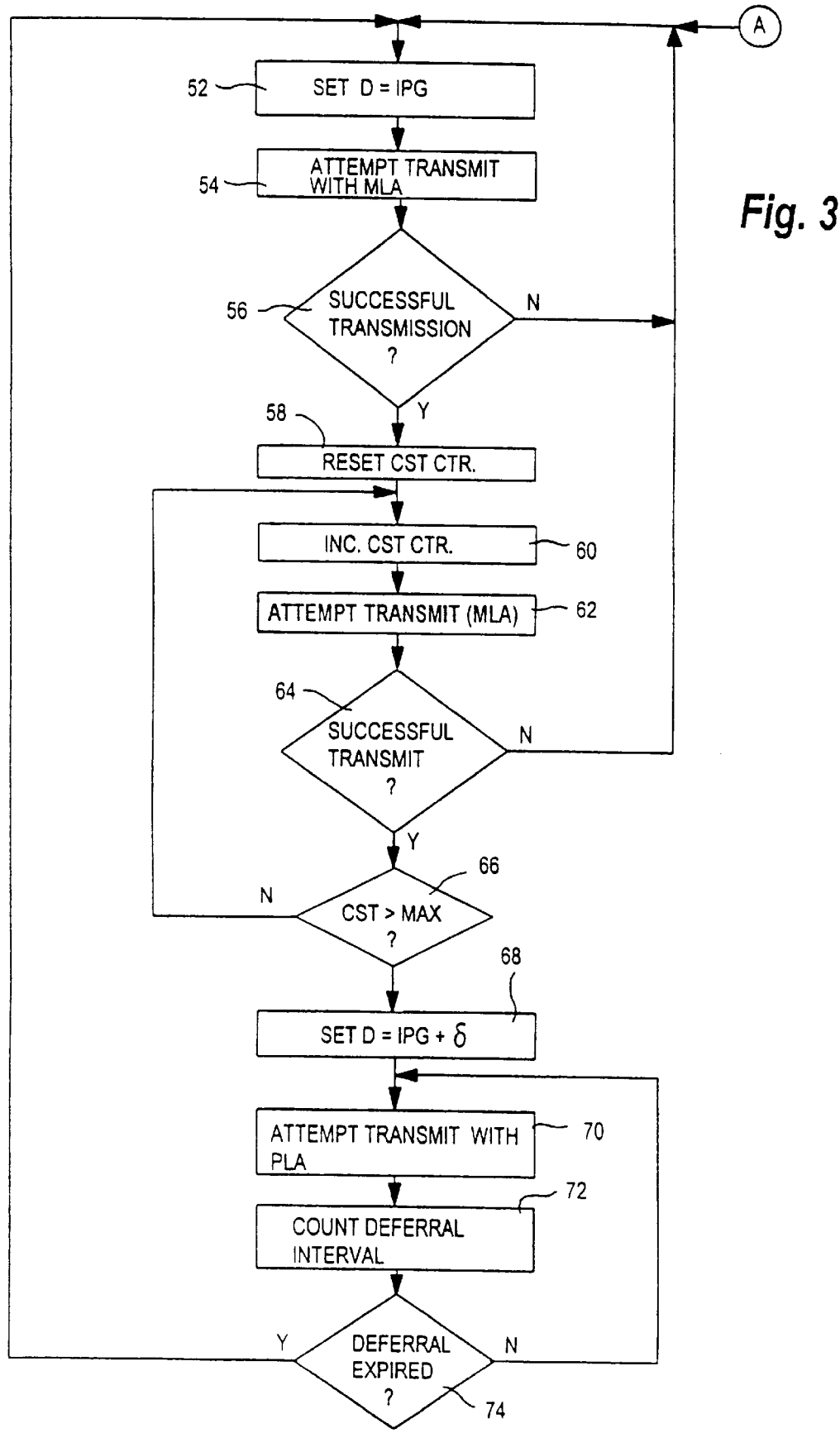
FIG. 3 is a flow diagram of the method for accessing media of a network according to a first embodiment of the present invention.

FIG. 3 is a flow diagram illustrating the method of accessing the media 50 of an Ethernet network according to the first embodiment. The disclosed methods of all three embodiments can be implemented as state machines within the MAC 22, or by embedding executable code within a memory element in the MAC 22 (e.g., register, EPROM, EEPROM, flash memory), where any of the methods may be activated by a user as optional execution modes. The MAC 22 begins by setting a programmable delay timer (D) to have an IFS delay interval equal to predetermined interpacket gap (IPG) interval, specified by Ethernet (ANSI/IEEE 802.3) protocol. The predetermined interpacket gap interval (IPG) is defined as 96 bit times for 10 megabit per second, 100 megabit per second, and 1000 megabit per second networks.

Setting the delay timer (D) to equal the minimum IPG establishes a minimum latency access (MLA) mode in the network station. In other words, the MLA mode is defined as the attempt by the MAC 22 to transmit data on the medium using the minimum allowed interframe spacing specified by the delay timer (D), namely D=IPG. The MAC 22 then attempts to transmit data packets on the media in step 54 using the minimum latency access (MLA) mode. The step of attempting to transmit data on the media 50 is described in more detail below with respect to FIG. 5.

If the MAC 22 determines in step 56 that the transmission attempt in step 54 was not successful, the MAC 22 returns to step 52 to retry transmission attempts in the MLA mode. If transmission was successful, the MAC 22 resets in step 58 a consecutive successful transmission (CST) counter that monitors the number of consecutive packets successfully transmitted by the MAC 22.

After the CST counter is reset in step 58, The MAC 22 increments the CST counter in step 60 to record the successful transmission from step 54. The MAC 22 then attempts to transmit another data packet in step 62 according to the MLA mode. After attempting transmission in step 62, the MAC 22 checks in step 64 if the transmission attempt was successful. If the MAC 22 determines the transmission attempt was not successful, the MAC 22 returns to step 52. Otherwise, if the MAC 22 was successful in transmission, the MAC 22 checks in step 66 whether the CST counter exceeds a predetermined threshold that defines the number of consecutive successful transmissions necessary for a station to capture the media channel. If the MAC 22 determines in step 66 that the CST counter does not exceed predetermined threshold (MAX), the MAC 22 returns to step 60 to increment the CST counter after the last successful transmission.

If the MAC 22 determines in step 66 that the CST counter exceeds the threshold (MAX), the MAC 22 sets the delay time (D) to include the predetermined interpacket gap interval (IPG) plus an additional time interval ($\delta$) in step 68. The value $\delta$ is based on the maximum round trip delay between two stations, defined as a slot time ($t_s$), where $\delta = t_s$. A slot time ($t_s$) is defined as 512 bit times for 10 MB/s and 100 MB/s networks. Hence, the delay $\delta$ has a duration of greater than 51.2 microseconds and 5.12 microseconds in 10 megabit per second and 100 megabit per second networks, respectively. The value $\delta$ has a preferred value of greater than 4096 bit times for 1000 megabit per second networks, although other values may be used consistent with the network topology and propagation characteristics.

Hence, the MAC 22 in step 68 sets the programmable delay timer to a value D=IPG+$\delta$, where the delay ($\delta$) preferably has a duration equal to the slot time. The increased value in the delay timer establishes a programmed latency access (PLA) mode for the network station, where the network station increases the interframe spacing (IFS) interval between data packets. Hence, the PLA mode enables other stations on the network to access the media, thereby reducing the capture effect of the network station having performed a successful number of transmits greater than the threshold for a captured channel (MAX). Hence, other nodes that were previously deferring to this dominant node will now have an opportunity to access the channel.

The MAC 22 then attempts to transmit on the network media in step 70 using the PLA mode in step 70. The MAC 22 simultaneously begins monitoring the deferral interval of the PLA mode in order to limit the latency experienced by the MAC 22.

Figure 4A:
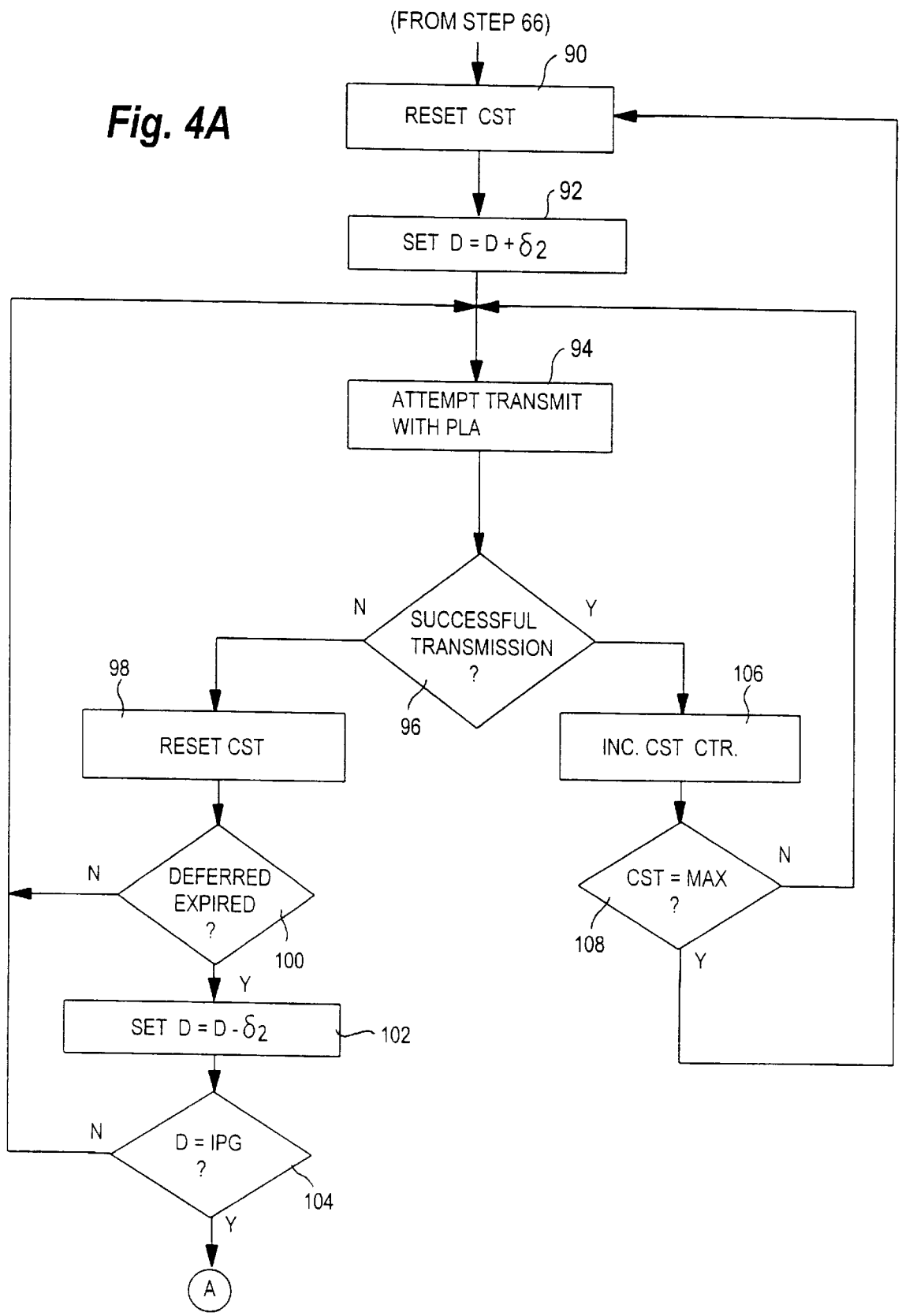
FIGS. 4A, 4B and 4C are flow diagrams illustrating variations in the method of FIG. 3.
Figure 4B:
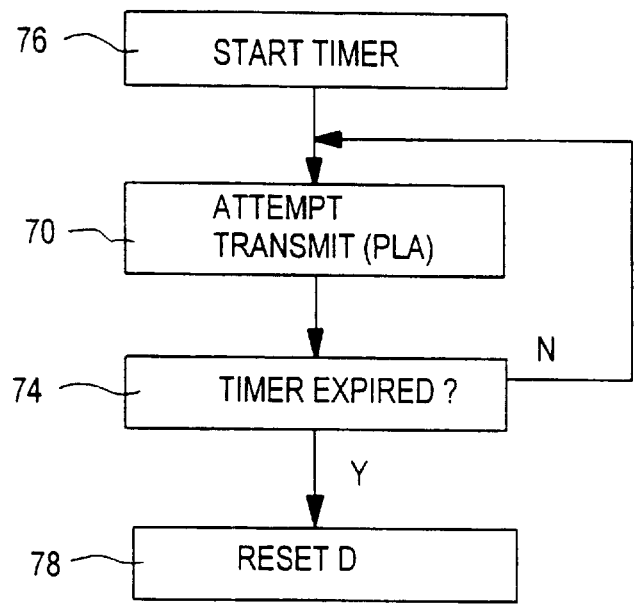
Figure 4C:
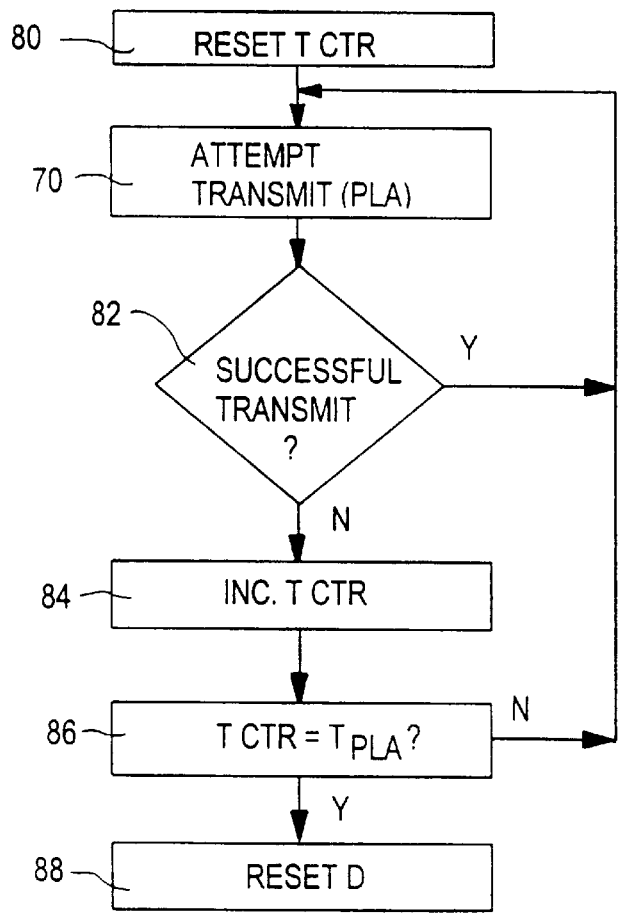

FIGS. 4B and 4C are flow diagrams illustrating different methods of monitoring the deferral interval during which time the MAC 22 operates in the PLA mode. FIG. 4B illustrates monitoring the predetermined deferral interval as a predetermined time interval that limits the amount of time the MAC 22 operates according to the PLA mode. FIG. 4C monitors the predetermined deferral interval by counting the number of successful transfers by other network stations as detected on the media.

As shown in FIG. 4B, the MAC 22 starts a deferral timer in step 76, also referred to as a deferral monitor, simultaneously with the setting of the delay time in step 68. The MAC 22 then continues with attempting to transmit data in the PLA mode in step 70. The MAC 22 checks after each transmission attempt in step 74 whether the deferral timer has expired, for example, whether the timer has reached a predetermined interval ($t_{PLA}$). If the MAC 22 determines that the deferral timer has not expired, then additional transmission attempts are repeated in step 70 using the PLA mode. If the timer has expired in step 74, the delay timer (D) is reset to the minimum IPG in step 78. Hence, the deferral timer identifies a reduced throughput time interval of the network station, and enables the reduced throughput of the PLA mode to have a limited duration in order to guarantee access latency in the network station.

FIG. 4C discloses an alternate method of monitoring the predetermined deferral interval based on the number of successful transmissions by other network stations. The monitoring of the deferral interval begins by resetting a transmit (T) counter in step 80, also referred to generally as the deferral monitor, which monitors the number of successful transmissions by other network stations. The MAC 22 then attempts transmission using the PLA mode in step 70, enabling other network stations the opportunity to access the media channel. The MAC 22 then checks whether transmission was successful in step 82. If the MAC 22 determines that transmission was successful, then the MAC 22 attempts to transmit another data packet using the PLA mode. However, if the MAC 22 was not successful in transmitting the data packet, the transmission counter is incremented in step 84, indicating that another network station was successful in transmitting a data packet. The MAC 22 then checks in step 86 whether the transmission counter equals a predetermined number of data transfers by other network stations ($T_{PLA}$). If the predetermined number has not been reached, the MAC 22 returns to step 70 to continue transmission attempts using the PLA mode. However, if the transmission counter equals the predetermined number in step 86, the delay timer is reset in step 88 to the minimum IPG interval.

Hence, the network station remains in the programmed latency access (PLA) mode for a predetermined deferral interval, monitored by either a programmable timer or a programmable counter. Once the network station has operated in the reduced-throughput PLA mode for the duration of the deferral interval, defined by the time interval ($t_{PLA}$) or the number of transmissions ($T_{PLA}$), the network station returns to the minimum latency access (MLA) mode, where the delay timer is reset to the minimum IPG interval.

FIG. 4A is a variation of the programmed latency access (PLA) mode of FIG. 3, where the network station may repeatedly increment the delay timer by a predetermined delay interval ($\delta_2$). In this case, the value of the delay interval ($\delta_2$) need not necessarily be greater than one-half the slot time ($t_s$). Hence, the method of FIG. 4A enables a network station to "hunt" for the appropriate interframe spacing (IFS) by increasing the programmable delay (D) by the delay interval ($\delta_2$) after every programmable number of consecutive successful transfers (CST). Hence, the method of FIG. 4A ensures that the network station can successfully defer to nodes that need a large interframe spacing (IFS) between transfers.

As shown in FIG. 4A, the MAC 22 begins the dynamic adjustment of the IFS after step 66 of FIG. 3 by resetting the CST counter in step 90 to zero. After resetting the CST counter, the MAC 22 increments the delay timer (D) in step 92 by the programmable delay ($\delta_2$). After resetting the programmable delay (D), the MAC 22 attempts transmission according to the PLA mode in step 94, which corresponds to step 70 of FIG. 3. After attempting transmission in step 94, the MAC 22 determines in step 96 whether transmission was successful. If transmission was not successful by the network station, the CST counter is reset in step 98, and the MAC 22 checks whether the deferral interval has expired in step 100 using one of the counting techniques illustrated in FIGS. 4B and 4C. If the deferral interval has not expired in step 100, the MAC 22 retries transmission in step 94. However, if the deferral interval has expired, the delay timer (D) is reset in step 102 by decrementing the delay timer by the programmable value ($\delta_2$). If the programmable timer is set to the minimum IPG value in step 104, the method returns to the initial minimum latency access (MLA) mode, shown in FIG. 3.

If in step 96 the MAC 22 determines that transmission was successful, the CST counter is incremented in step 106. If the MAC 22 determines in step 108 that the CST counter has reached the predetermined threshold (MAX) indicating capture of the media channel, the CST counter is reset in step 90 and the delay timer (D) is incremented with another delay in step 92 ($\delta_2$) to further increase the interframe spacing between transfers by the network station. Hence, the method of FIG. 4A enables the MAC 22 to automatically tune for any variance in the IFS capabilities of nodes that share the medium. At the same time, the MAC 22 maintains the deferral interval for a limited time to ensure access latencies stay within a maximum bound.

Figure 5:
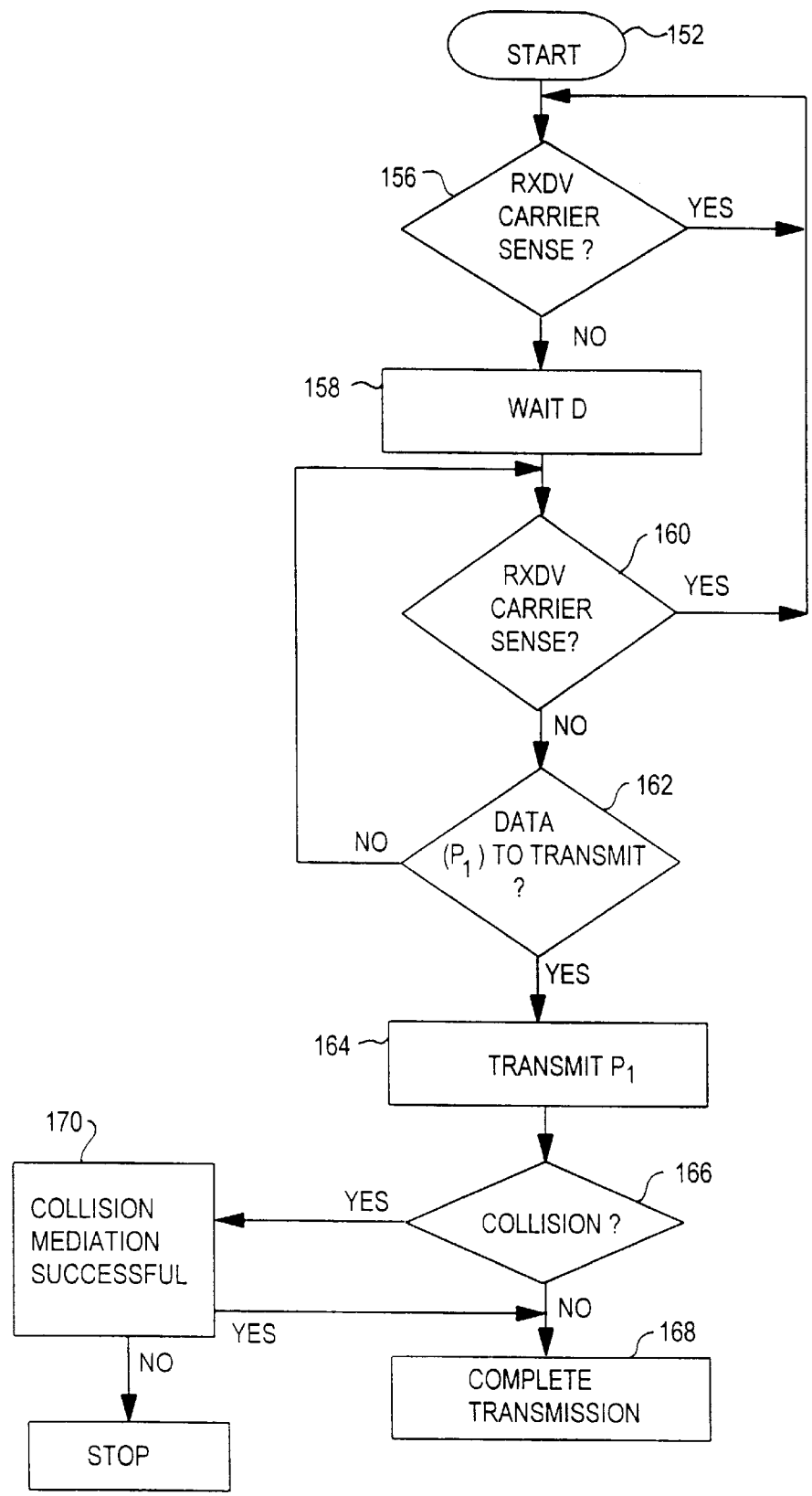
FIG. 5 is a flow diagram illustrating in detail the steps of attempting to transmit a data packet onto the media.

FIG. 5 is a diagram illustrating in detail the attempt by the MAC 22 to attempt access of the media, for example in steps 54, 62, 70, and 94. The media access controller (MAC) 22 in the network interface 10 starts in step 152, during which point the Ethernet media 50 is busy with transmission activity by a station. The MAC 22 then checks in step 156 if a receive carrier is sensed on the media 50 using the CSMA/CD, indicating that the network is busy. If the receive carrier is sensed, the MAC 22 waits in step 156 until deassertion of the receive carrier on the media 50 is detected. The MAC 22 starts the delay timer in step 158 in response to the sensed deassertion of the receive carrier, which causes the MAC 22 to wait the programmed delay time (D). As described above, the delay timer (D) in the MLA mode waits the minimum IPG interval of 9.6 microseconds ($\mu s$) for a 10 Mbit/s network and 0.96 $\mu s$ for a 100 Mbit/s network. A similar IPG interval can be provided for a 1000 Mbit/s network.

While waiting the programmed delay time (D), the MAC 22 checks in step 160 if the carrier is detected on the media 50. If a carrier is detected in step 160, the MAC 22 returns to the wait state in step 156, causing the delay timer to be reset to the programmed delay time (D). If no carrier is detected during the delay interval, the MAC 22 checks in step 162 whether the transmit FIFO 32 has a data packet (P1) to send. If the transmit FIFO 32 has data to send, the MAC 22 begins to transmit the data packet in step 164.

Step 160 may also be implemented according to the optional two-part deferral algorithm in the IEEE 802.3 specification, where if the device detects activity during part 1 (i.e., the first ⅔ of the IPG), it resets its deferral counter. If no activity occurs during part 1, the device can ignore carrier sense during part 2 (i.e., the last third of the IPG) and begin transmitting at the end of the IPG regardless of whether activity was detected during part 2.

After transmission has begun in step 164, the MAC 22 checks in step 166 to determine whether a collision has been detected. If no collision is detected in step 166, the transmission of the data packet is completed in step 168.

If a collision is detected in step 66, the MAC 22 performs collision mediation, for example using the truncated binary exponential backoff (TBEB) algorithm. If the MAC 22 determines in step 170 that the collision mediation is successful, the transmission is completed in step 168. If collision mediation is not successful, the data packet is discarded.

Figure 6A:
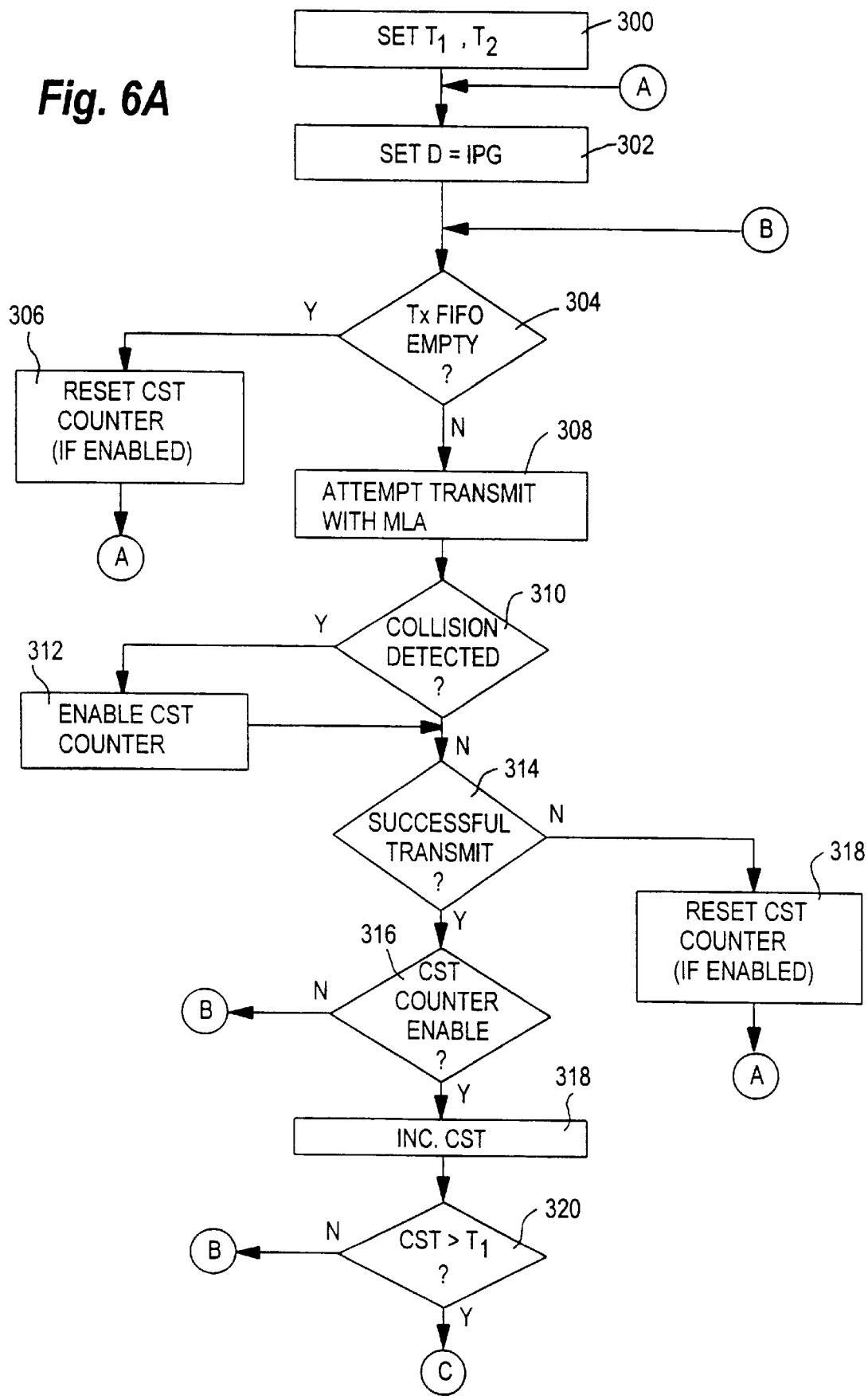
FIGS. 6A and 6B are flow diagrams summarizing a method for accessing the media by selectively increasing the delay time according to a second embodiment of the present invention.
Figure 6B:
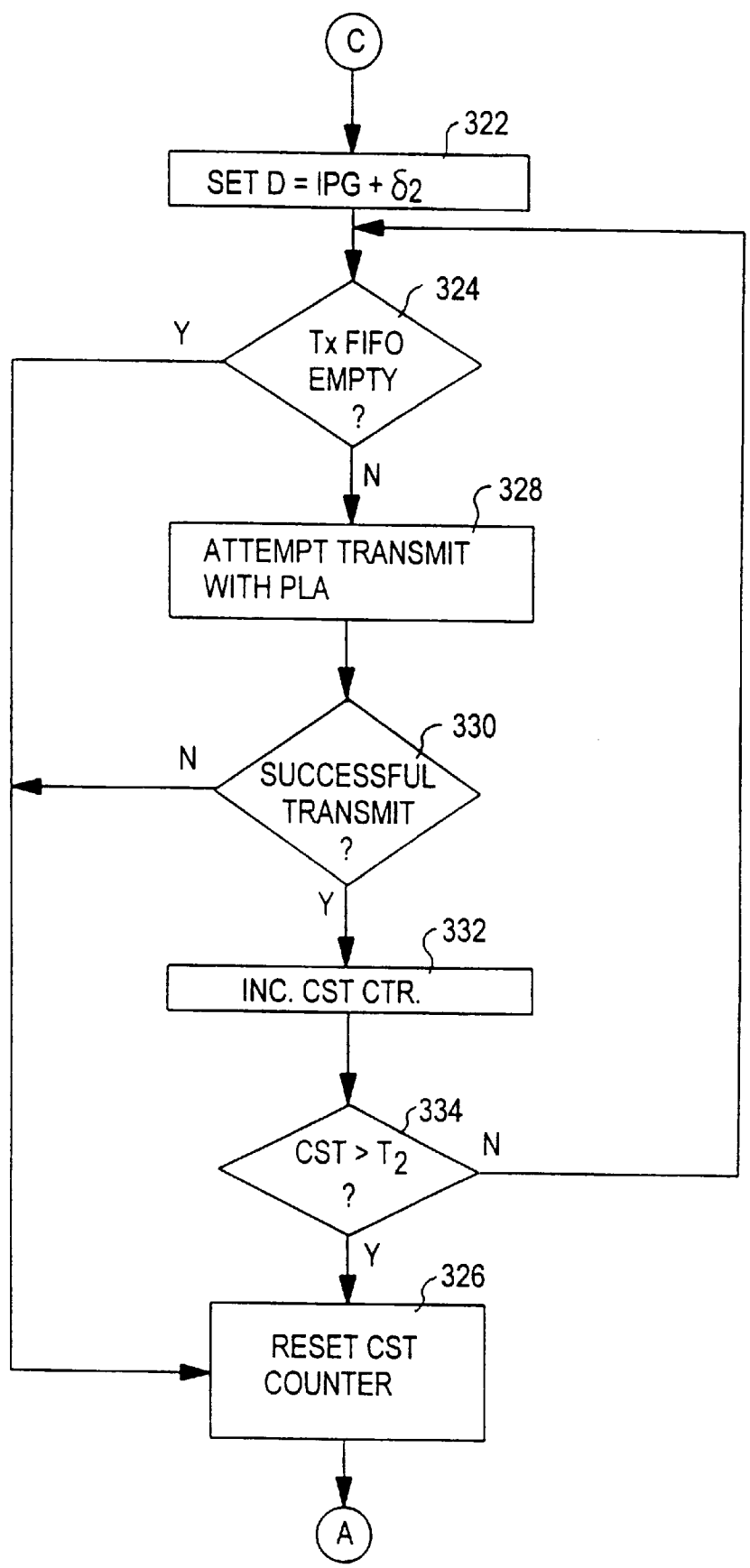

FIGS. 6A and 6B summarize a flow diagram of an improved arrangement for selectively reducing capture effect according to the second embodiment of the present invention. The method of FIGS. 6A and 6B includes the improvement of enabling the consecutive station transmit (CST) counter upon detecting a transmission attempt by another station, for example by detecting the presence of a collision. Since the CST counter is enabled only after a transmission attempt by another station is detected, the arrangement for selectively reducing channel capture optimizes burst throughput by increasing the delay time (D) only when necessary.

The method of FIG. 6A begins in step 300, where a first threshold ($T_1$) and a second threshold ($T_2$) are set by a user, for example by writing a predetermined value into a programmable register. The first threshold $T_1$ specifies the maximum number of consecutive successful transmissions by the network station interleaved with the minimum IPG as the delay interval, and the second threshold specifies a maximum duration by the network station of using a second delay interval greater than the first minimum interval. The threshold $T_2$ corresponds to a higher threshold of the CST counter, although the threshold $T_2$ may alternately correspond to the time interval ($t_{PLA}$) of FIG. 4B, or the number of data transfers by other network stations ($T_{PLA}$) of FIG. 4C. Hence, the threshold $T_1$ specifies the number of consecutive successful transmissions interleaved with the minimum interpacket gap, and the threshold $T_2$ determines the limit using the deferral interval having a duration greater than the minimum IPG. Factors in selecting the threshold values are discussed below.

After the thresholds have been set in step 300 by a user, the MAC 22 sets in step 302 the delay time D to the predetermined minimum IPG and defers for time D. After deferring for time D, the MAC 22 then checks in step 304 if the transmit FIFO 32 has data packets for transmission on the network.

If the MAC 22 determines the transmit FIFO is empty, the MAC 22 resets the CST counter, if enabled, and returns to step 302 to reset the delay time to the minimum IPG. If the MAC 22 finds transmit data in the transmit FIFO, the MAC 22 attempts transmission in step 308 in the minimum latency access (MLA) mode. The MAC 22 determines in step 310 whether another station is attempting to transmit on the media by determining whether a collision is detected. If a collision is detected, indicating that another station is attempting access of the media, the MAC 22 enables the CST counter in step 312. However, if no collision is detected such that the MAC 22 does not detect another station attempting to transmit data, the MAC 22 continues without enabling the CST counter. The MAC 22 then checks in step 314 whether transmission of the packet was successful. If transmission was successful, the MAC 22 checks in step 316 whether the CST counter was enabled. If the MAC 22 determines that the CST counter was not enabled, the method returns to step 304. However, if the MAC 22 determines in step 314 that transmission was not successful, for example due to the network station losing collision mediation to another station, the MAC 22 resets the enabled CST counter in step 318, and returns to step 302 for resetting of the delay time to the minimum interpacket gap.

Hence, the MAC 22 operates in the minimal latency access (MLA) mode and does not enable the CST counter until a collision is detected. Since there is no concern for deferral if no other station is contending for access of the media, the burst throughput of the network station is maximized.

If in step 316 the MAC 22 determines that the CST counter is enabled, the MAC 22 increments the CST counter in step 318, and checks in step 320 if the CST counter value exceeds the first threshold $T_1$. If in step 320 the MAC 22 determines that the CST counter does not exceed the first threshold $T_1$, the MAC 22 returns to step 304. Hence, the MAC 22 transmits data packets in the MLA mode until the CST counter exceeds the threshold $T_1$ indicating that the network station has captured the media. Moreover, the CST counter is reset to zero in step 306 if the transmit FIFO 32 is empty, or in step 318 if another station successfully transmits the data packet, respectively, indicating the network station has not captured the media.

If in step 320 the MAC 22 determines that the CST counter exceeds the predetermined threshold, the MAC 22 increases the delay time by an additional time interval ($\delta_2$) equal at least to the slot time. Hence, the delay time will be set to a minimum of 608 bit times, including the minimum IPG plus one slot time. After increasing the delay time by at least one slot time, the MAC 22 checks in step 324 whether the transmit FIFO 32 is empty. If the transmit FIFO 32 is empty, the MAC 22 resets the CST counter in step 326 and returns to step 302 to reset the delay time equal to the minimum IPG. However, if the transmit FIFO 32 has data for transmission, the MAC 22 attempts transmission in step 328 according to the PLA mode, described above in detail with respect to FIG. 5. Specifically, the MAC 22 will wait the programmed delay time to determine presence of a carrier sense and a receive valid data signal. If a receive valid data signal is detected, the MAC 22 determines that another station successfully transmitted a data packet, and moves from step 330 to step 326.

However, if there is no carrier sense, the MAC 22 begins to transmit after the delay time (D). If during transmission the MAC 22 determines in step 330 that collision mediation is not successful and another station successfully transmits a data packet, the MAC 22 jumps to step 326 to reset the CST counter and the delay timer back to the minimum IPG in step 302. Alternatively, the MAC 22 can continue to count the deferral interval as described in detail above with respect to FIGS. 4B and 4C.

If the MAC 22 determines in step 330 that transmission was successful, the MAC 22 increments the CST counter in step 332 and checks in step 334 to determine if the CST counter exceeds the second threshold. If the MAC 22 determines the CST counter exceeds the second threshold, then the MAC 22 resets the CST counter in step 326 and the delay time (D) to the minimum IPG in step 302 of FIG. 6A. However, if the MAC 22 determines that the CST counter does not exceed the second threshold, the MAC 22 returns to step 324 to continue transmission in the PLA mode.

The effectiveness of the capture avoidance technique depends on the value of the first transmission burst threshold ($T_1$). If the threshold is set too low, then the network station frequently introduces extra delay and therefore reduces burst (and consequently network) throughput. For example, if the threshold is set to 3, the network station will waste one slot time for every burst of three frames. If the frames are of maximum length, which is the normal case for long bursts of data sent from one node, the throughput will be reduced by 1.05%. If the threshold is increased to 10, one slot time is wasted for every burst of ten frames, and the throughput is reduced by only 0.38%.

However, if the transmission burst threshold ($T_1$) is set too high, the other node may be forced to back off so far that the other node misses the chance to transmit without a collision. Table 1 below shows the maximum backoff period in terms of slot times and maximum length frames as a function of collision number. After the fourth consecutive collision, a node may need to back off for a period longer than the time required to send a maximum length frame.

TABLE 1

| Coll. # | Max. backoff Slots | Max. Frames |
| --- | --- | --- |
| 3 | 7 | 0.30 |
| 4 | 15 | 0.63 |
| 5 | 31 | 1.31 |
| 6 | 63 | 2.66 |
| 7 | 127 | 5.35 |
| 8 | 255 | 10.75 |
| 9 | 511 | 21.54 |
| 10 | 1023 | 43.13 |

As shown in Table 1, if a losing node loses five collision contests, that losing node may backoff as many as thirty-one slot times, equivalent to 1.3 maximum length frames.

Figure 7:
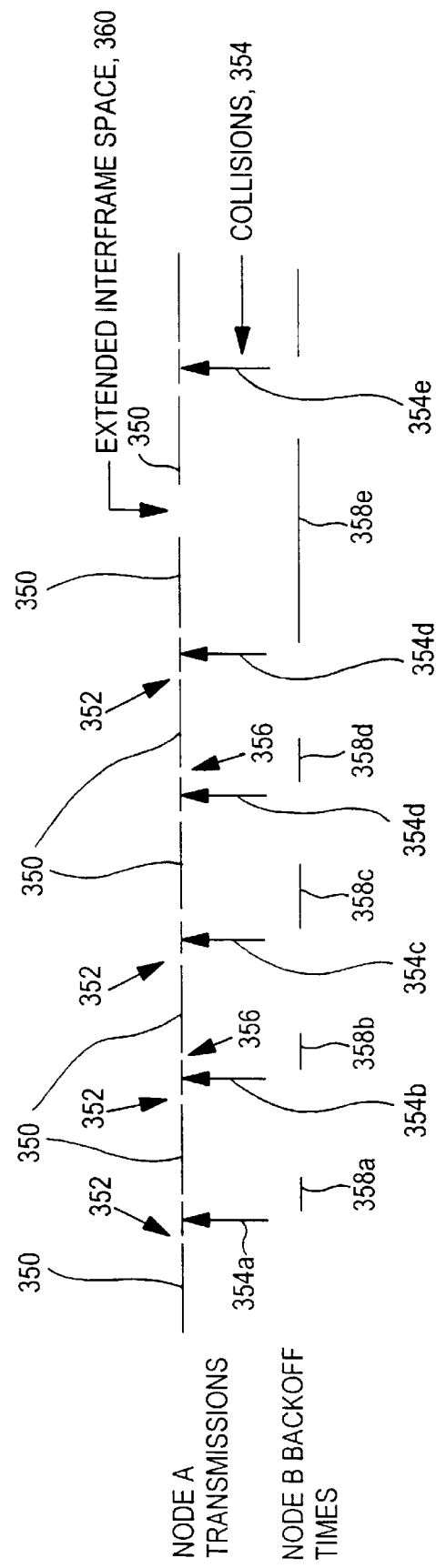
FIG. 7 is a diagram illustrating a network station capturing the media.

FIG. 7 is a diagram illustrating a network station (node A) capturing the media from node B, where node A transmits a consecutive number of packets during transmit intervals 350 and waits a delay time 352 equal to the minimum IPG. Node B attempts access after each delay time 352 and encounters a collision 354 with node A, after which the node A calculates a backoff slot time 356 that is less than the backoff slot times 358 of node B. Since node A wins the collision mediation, its collision counter is reset to zero, such that the calculated collision backoff interval 352 will be no more than a single slot time. Node B, however, encounters repeated collisions, such that after the fifth consecutive collision 354d the collision backoff interval 358e of node B (equal up to 1.31 maximum length frames) can exceed the time by node A to transmit a maximum length frame 350 and wait an extended interframe space 360. Hence, the winning node A will have finished its extended deferral 360 and will have started transmitting another frame before the losing node B is ready to transmit again.

Hence, the arrangement of FIGS. 6A and 6B provides a balance between throughput and minimizing the capture effect problem by enabling the CST counter only after a collision has occurred. The problem of missing the extended deferral period because of long backoff times can be alleviated by forcing the winning node to extend its deferral period for more than one interframe space by associating two threshold values ($T_1$ and $T_2$) with the CST counter, where the deferral interval is extended for a maximum number ($j=T_2-T_1$) of extended interframe spaces 360. This maximum number (j) gives a losing station a number of attempts to transmit a data packet, enabling a losing station having a long backoff interval to have a greater probability of accessing the media.

Figure 8:
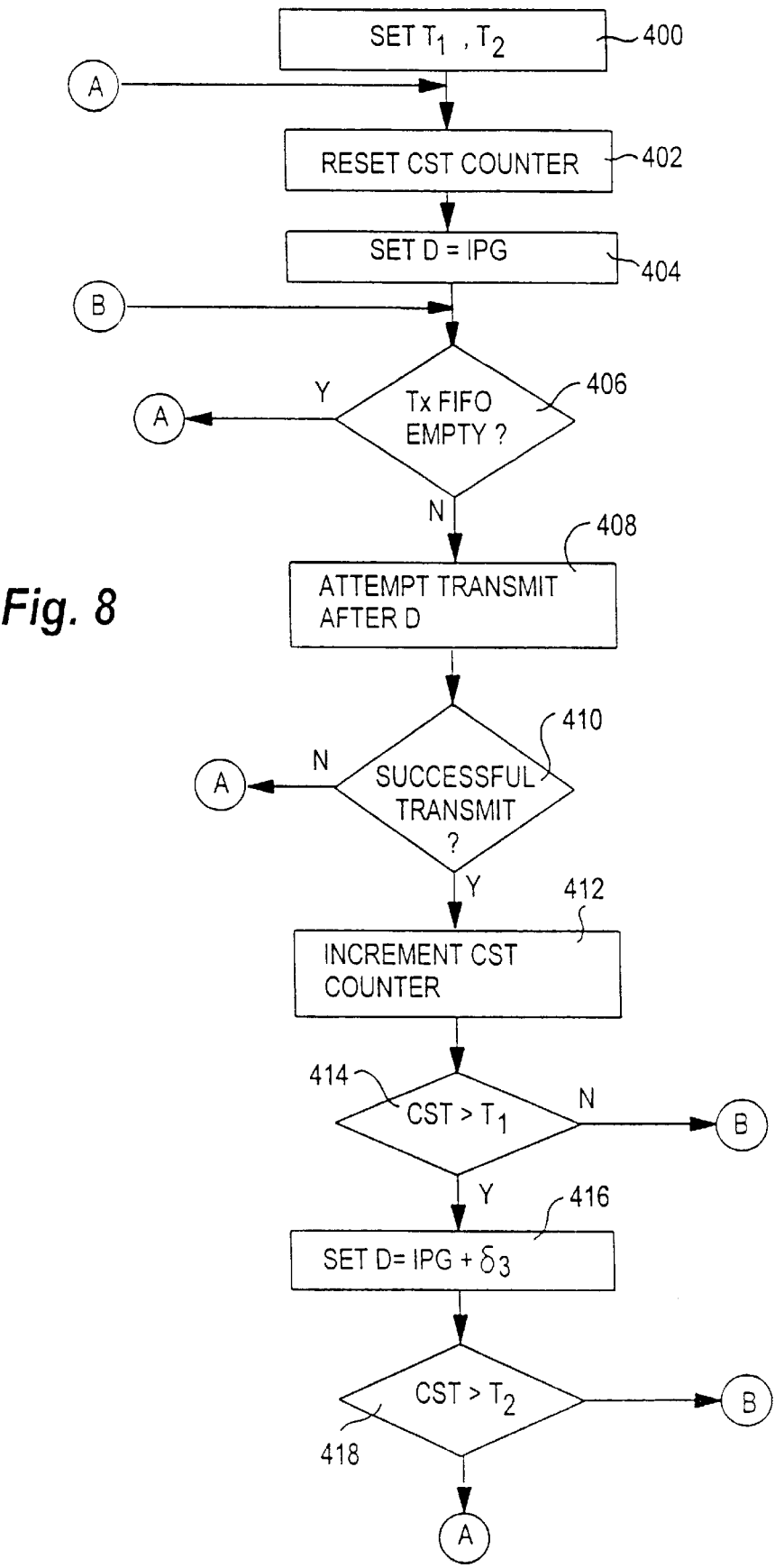
FIG. 8 is a flow diagram summarizing a method for accessing the media by selectively increasing the delay time according to a third embodiment of the present invention.

FIG. 8 is a diagram illustrating in detail the use of two thresholds associated with the CST counter according to the third embodiment in order to provide a fast throughput mode and a slow throughput mode, regardless of whether another station is attempting to transmit. The method begins in step 400 by a user setting the two thresholds $T_1$ and $T_2$. The first threshold $T_1$ specifies a maximum number of consecutive successful transmissions by the network station interleaved with the minimum IPG, and the second threshold specifies a maximum number of consecutive successful transmissions by the network station interleaved with a second delay interval greater than the minimum IPG. The MAC 22 then initializes by resetting the CST counter in step 402, and setting the delay equal to the minimum IPG and waiting the delay D in step 404.

After waiting the delay D, the MAC 22 then checks in step 406 if the transmit FIFO 32 is empty. If the transmit FIFO 32 is empty, there is no concern for capture effect, and the MAC 22 returns to step 402 to reset the CST counter and set the delay time equal to the minimum IPG. If the transmit FIFO 32 has data to send, the MAC 22 attempts to transmit the data in step 408. The MAC 22 then checks in step 410 whether transmission was successful, as described above with respect to step 328 of FIG. 5. If transmission was successful, the MAC 22 increments the CST counter in step 412. However, if transmission was not successful, for example due to successful transmission by another network station winning a collision mediation, the MAC 22 returns to step 402 to reset the CST counter and reset the delay time to the minimum IPG.

The MAC 22 then checks in step 414 if the incremented CST counter exceeds the first threshold $T_1$. If the CST counter does not exceed the threshold $T_1$, the MAC 22 returns to step 406 to continue transmission of data packets after delaying the minimum IPG interval. However, if the MAC 22 determines in step 414 that the CST exceeds the first threshold $T_1$, the MAC 22 increases the delay time D by adding to the minimum IPG a delay interval $\delta$ equal to one slot time interval ($\delta$) plus a user-programmed time interval ($t_{user}$) (i.e., $\delta_3=\delta+t_{user}$). The MAC 22 then checks in step 418 if the CST counter exceeds the second threshold $T_2$. If the CST counter does not exceed the second threshold $T_2$, the MAC 22 returns to step 406 to transmit another packet after delaying transmission using the increased delay interval as set in step 416. The MAC 22 then transmits data packets interleaved with the second delay interval having a sufficient delay to enable another station access to the media. Hence, the MAC 22 outputs a consecutive number of packets, where the value ($j=T_2-T_1$) specifies the maximum number of consecutive successful transmissions by the network station interleaved with the second delay interval greater than the first minimum interval. If in step 418 the CST counter exceeds the second threshold $T_2$, then the MAC 22 returns to the MLA mode by resetting the CST counter in step 402 and setting the delay time back to the minimum IPG in step 404.

Hence, FIG. 8 illustrates that the transmitting station will transmit a prescribed number of data packets interleaved with the second delay interval, enabling a losing station, or a slower station subject to surrender effect, a number of attempts to transmit a data packet during one of the deferral intervals greater than the minimum IPG. Increasing the second threshold $T_2$ increases the number of times that the interframe space is extended to increase the probability that another node can gain access to the medium. At the same time the second threshold limits the number of times that the interframe space is extended and therefore limits the amount of bandwidth that is wasted.

The reduction in burst throughput in order to reduce the capture effect can be quantified as follows. Assume that when transmission bursts occur, the frames transmitted are of maximum length. The maximum Ethernet frame length is 1518 bytes, the preamble length is 8 bytes, and the minimum interframe space (IPG) is 12 bytes. Hence, the time from the start of one frame to the start of the next frame is $$T_{01} = (1518+8+12)T_b = 1538 T_b$$

where $T_b$ is the time required to transmit one byte (0.8 microseconds at 10 Mbps or 0.08 microseconds at 100 Mbps).

If the delay time is extended by one slot time (64 bytes), the time from the start of one frame to the start of the next frame increases to $$T_{02} = T_{01} + 67 = 1602 T_b$$

The time $T_{ca}$ equals the time required to transmit $T_2$ frames using the method of FIG. 8, where $$T_{ca} = 1538 T_b T_1 + 1602(T_2 - T_1)$$

If $T_n$ equals the time required to transmit $T_2$ frames within the minimum IFS, then $$T_n = 1538 T_b T_2$$

Hence, the reduction in throughput due to collision avoidance is $T_{ca}/T_n - 1$.

Table 2 shows the percentage reduction in throughput for several values of $T_1$ and $T_2$.

TABLE 2

| T2 ↓ | T1→ 1 | 2 | 3 | 4 | 5 | 6 | 7 | 8 |
|---|---|---|---|---|---|---|---|---|
| 2 | 2.08% | | | | | | | |
| 3 | 2.77% | 1.39% | | | | | | |
| 4 | 3.12% | 2.08% | 1.04% | | | | | |
| 5 | 3.33% | 2.50% | 1.66% | 0.83% | | | | |
| 6 | 3.47% | 2.77% | 2.08% | 1.39% | 0.69% | | | |
| 7 | 3.57% | 2.97% | 2.38% | 1.78% | 1.19% | 0.59% | | |
| 8 | 3.64% | 3.12% | 2.60% | 2.08% | 1.56% | 1.04% | 0.52% | |
| 9 | 3.70% | 3.24% | 2.77% | 2.31% | 1.85% | 1.39% | 0.92% | 0.46% |
| 10 | 3.75% | 3.33% | 2.91% | 2.50% | 2.08% | 1.66% | 1.25% | 0.83% |
| 11 | 3.78% | 3.40% | 3.03% | 2.65% | 2.27% | 1.89% | 1.51% | 1.13% |
| 12 | 3.81% | 3.47% | 3.12% | 2.77% | 2.43% | 2.08% | 1.73% | 1.39% |
| 13 | 3.84% | 3.52% | 3.20% | 2.88% | 2.56% | 2.24% | 1.92% | 1.60% |
| 14 | 3.86% | 3.57% | 3.27% | 2.97% | 2.68% | 2.38% | 2.08% | 1.78% |

The above calculations assume that the deferral interval increases the interframe spacing by one slot time. However, the interframe spacing can be further increased by a programmable amount of time ($\delta_3 = 67 + t_{user}$) in order to allow a slower device to switch from receiving to transmitting mode. Hence, the method of FIG. 8 is particularly useful for backwards compatibility with slower devices that are susceptible to surrender effect because they are incapable of switching from receiving mode to transmitting mode within the minimum IPG.

Surrender effect is particularly noticeable in two-node situations, for example in TCP sliding window protocol. Specifically, a transmitting station is free to transmit N number of bytes, which may include a multiple number of packets. The receiving station at times is expected to send an acknowledgement indicating that X bytes have been received, enabling the transmitting station to know that it can transmit up to X plus N bytes. If the receiving station sends regular acknowledgements, the transmitting station can continue transmission indefinitely according to the sliding window protocol. However, if the transmitting station captures the media to the point where the client loses sixteen times, then according to Ethernet protocol the acknowledgement frame will be dropped by the losing client. Since the transmitting station never receives the acknowledgement frame, the transmitting station halts transmission at the end of its transmission window, and enters a wait state in order to wait for the acknowledgement frame from the client. Since the client has already dropped the acknowledgement frame, the media will remain idle until the transmitting station cycles through a retransmission timeout, for example at one second.

Hence, the present invention is particularly useful for any protocol that requires an acknowledgement between a client and a server.

Figure 9:
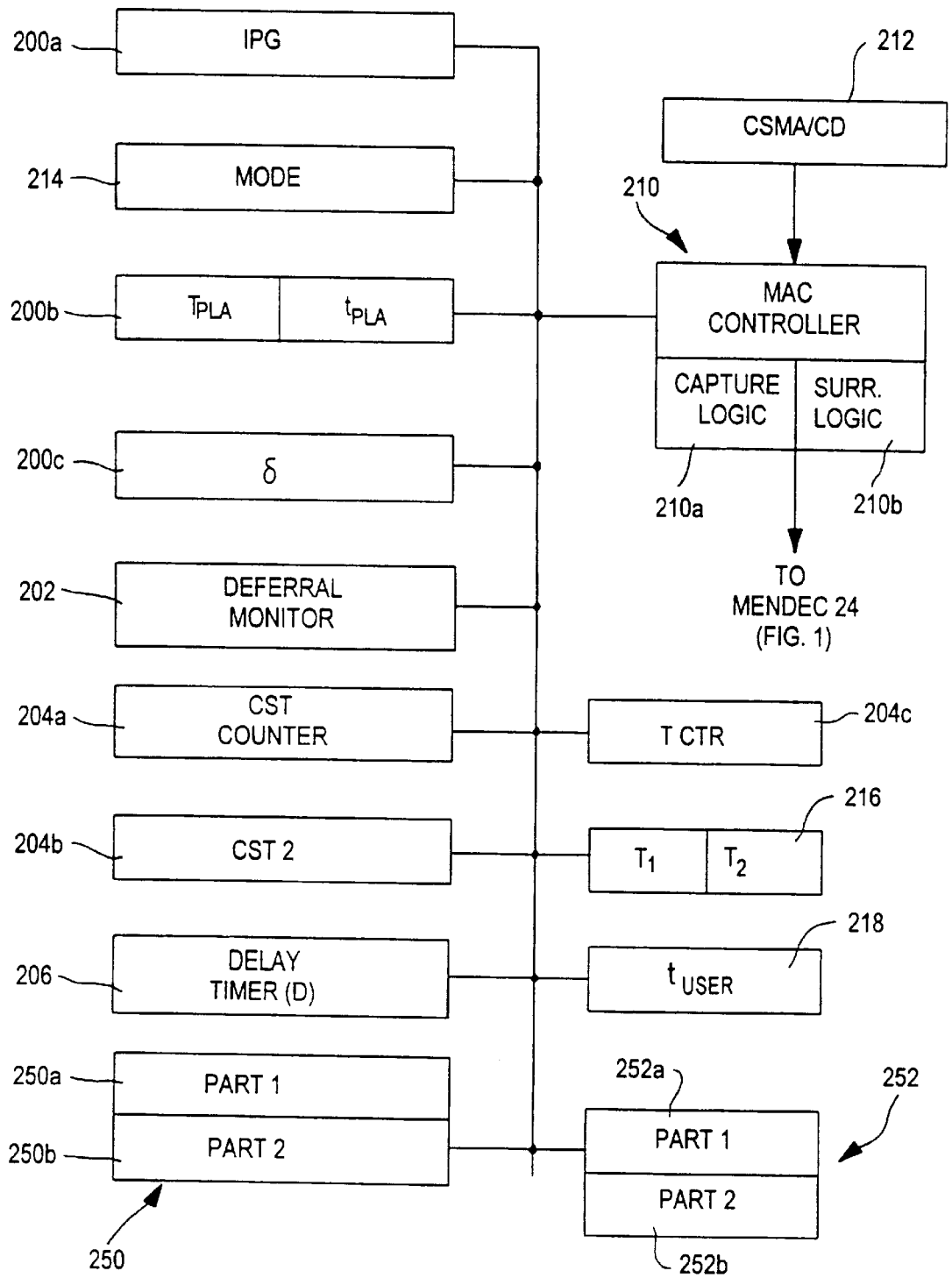
FIG. 9 is a block diagram of the media access control (MAC) of FIG. 1.

FIG. 9 is a block diagram illustrating the functional components of the MAC 22. The media access control 22 include registers 200$a$, 200$b$ and 200$c$ storing the minimum IPG value, the predetermined deferral intervals $T_{PLA}$ and $t_{PLA}$, and the slot time interval $\delta$, respectively. The MAC 22 also includes the deferral monitor 202 that monitors the duration of the PLA mode based upon the predetermined interval stored in register 200$b$, a CST counter 204$a$, and the programmable delay timer (D) 206. The MAC 22 also includes a register 216 storing the user-selectable threshold values $T_1$ and $T_2$, and a register 218 for storing the user-defined delay ($t_{user}$).

According to the disclosed embodiment, the MAC 22 also includes two pairs of IFS (interframe spacing) registers 250 and 252, respectively. The pair of registers 250 store the first and second parts of the 802.3 two-part deferral algorithm. Hence, register 250$a$ stores the first two-thirds of the minimum IPG, and register 250$b$ stores the second part of the two-part deferral algorithm of the minimum IPG, namely the last third of the IPG. Registers 252, however, store the first and second parts of the modified IPG, where register 252$a$ stores part one of the two-part deferral algorithm for the modified IPG (e.g., D=$I_{min}+\delta$), and register 252$b$ stores part two of the modified delay interval (D=$I_{min}+\delta$). As described above, the registers 252$a$ and 252$b$ store the first and second parts of the modified delay interval (D) calculated using any of the above-described techniques.

The MAC controller 210 includes capture logic 210$a$ and surrender logic 210$b$ that cause the MAC controller 210 to operate according to the second and third embodiments, respectively. Generally, the MAC controller 210 starts the appropriate delay timer 206 in response to a signal from the CSMA/CD 212 indicating that deassertion of the receive carrier on the media has been sensed. The MAC controller 210 sends an instruction to the Manchester encoder/decoder 24 to attempt access of the media after the delay timer 206 has reached the programmable delay time.

The MAC 22 also includes a mode register 214 enabling a user to select different modes of operation, for example standard Ethernet protocol, any of the three above-described embodiments, or any combination thereof. The network station also includes counters 204b and 204c that enable the station to operate a plurality of different counters simultaneously, depending on the value in the mode register. For example, one arrangement may include the capture effect logic 210a and the surrender effect logic 210b operating simultaneously. The capture effect logic 210a detects when the network station has transmitted a programmable number of consecutive frames while the other node is contending for access to the network (i.e., when a collision has occurred). In this case, one CST counter 204a is enabled upon detection of a collision. When the capture effect logic 210a determines the enabled CST counter 204a reaches the programmable number of consecutive frames, the capture effect logic 210a causes the MAC 22 to defer for one slot time plus the minimum IFS time for a prescribed number of transmission sequences ($T_2-T_1$).

The surrender effect logic 210b operates independently of the capture effect logic 210a, and uses counter 204b as a second CST counter (CST 2) to detect when the controller has transmitted a burst of $T_1$ frames regardless of contention by another station. The MAC 22 then defers for an additional slot time plus a programmable amount of time to allow a slower device to switch from receiving to transmitting.

The above arrangements reset to the MLA mode after detecting a single packet from another station. However, a third counter (T Ctr) 204c may be used to count the number of received frames, as described in step 84 of FIG. 4C, and may use another receive burst counter threshold register (not shown) to return to the minimum IFS after a predetermined number of frames have been received from the other station. Hence, the deferral interval may be extended until a prescribed number of frames (e.g., corresponding to acknowledgement frames or client requests) are received from the other station.

According to the present invention, the delay time is selectively increased in order to reduce the capture effect and/or the surrender effect with a minimal loss in throughput. Overall network throughput is improved because a station will have an opportunity to periodically transmit an acknowledge message to a dominant transmitting station. Backwards compatibility also enables newer network devices to be integrated into existing networked systems having older, slower network stations, reducing the cost of network upgrades. Hence, stations using transmission protocols such as the sliding window protocols will be able to operate at maximum efficiency, without the need for a transmitting station to halt transmission for a timeout interval in order to wait for an acknowledge.

Although the embodiments have been described with respect to Ethernet (802.3) protocol, it will be appreciated that this arrangement will be applicable to other communication protocols between two stations, such as a client and a server.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

We claim:

1. In a network station coupled to media of a network, a method of accessing the media, comprising:

enabling a counter in response to detection of a transmission attempt by a second network station on the network, the counter configured to count a number of consecutive successful transmissions by the network station;

determining if the number of consecutive successful transmissions counted by the enabled counter exceeds a first prescribed threshold;

if the number exceeds the first prescribed threshold, increasing a delay time to include a predetermined interpacket gap interval and an additional time interval;

sensing deassertion of a receive carrier on the media;

waiting the delay time in response to the sensed deassertion of the receive carrier; and attempting access of the media by the network station after the sensed deassertion of the receive carrier and the delay time.

2. The method of claim 1, wherein the attempting access step comprises:

detecting a valid frame from the second network station; and resetting the counter to zero and the delay time to the minimum interpacket gap in response to the detected valid frame.

3. The method of claim 1, further comprising:

determining if the counter exceeds a second prescribed threshold greater than the first prescribed threshold;

if the counter exceeds the second prescribed threshold, setting the delay time to the predetermined interpacket gap interval and resetting the counter to zero.

4. The method of claim 1, wherein the network station comprises a buffer for storing transmit data queued for transmission on the media, the method further comprising:

determining an absence of the transmit data in the buffer; and resetting the counter to zero and the delay time to the minimum interpacket gap based on the determined absence of the transmit data in the buffer.

5. The method of claim 4, wherein said additional time interval corresponds to a predetermined slot time interval.

6. The method of claim 3, further comprising storing the first and second prescribed thresholds in user-programmable registers.

7. The method of claim 1, further comprising detecting the transmission attempt by the second station by sensing a collision on the media.

8. The method of claim 1, wherein the network is a CSMA/CD network, the predetermined interpacket gap interval equal to ninety six (96) bit times and the additional time interval equals a network slot time.

9. The method of claim 8, wherein the network slot time equals at least five hundred twelve (512) bit times.

10. The method of claim 8, wherein the network has a data rate of 1000 megabits per second and the predetermined slot time is approximately four thousand ninety six (4096) bit times.

11. A network interface for connection with media of a network, comprising:

a sensor sensing network activity including at least one of deassertion of a carrier on the media and collision on the media;

a programmable timer counting a programmable delay interval in response to the sensed deassertion of said carrier, the programmable delay interval having a value of at least a predetermined interpacket gap interval;

a transmitter outputting a data frame onto the media in response to a determined absence of activity by said sensor during the programmable delay interval;

a transmission burst counter enabled by a collision detected by the sensor and configured to count consecutive transmissions of the data packets by the transmitter; and a controller increasing the programmable delay interval from the predetermined interpacket gap interval in response to the transmission burst counter exceeding a first prescribed number of consecutive successful transmissions.

12. The interface of claim 11, further comprising a transmit queue, the controller resetting the programmable delay interval and the transmission burst counter upon detection of no transmit data in the transmit queue.

13. The interface of claim 12, further comprising a receiver for detecting a data frame from another network station, the controller resetting the programmable delay interval and the transmission burst counter in response to detection of the data frame by the receiver.

14. The interface of claim 11, further comprising:

a first register storing the first prescribed number of consecutive successful transmissions; and a second register storing a second prescribed number of consecutive successful transmissions, the controller resetting the programmable delay interval and the transmission burst counter in response to the transmission burst counter exceeding the second prescribed number of consecutive successful transmissions.

15. The interface of claim 14, wherein the first and second registers are user-programmable registers.

16. In a network station coupled to media of a network, a method of accessing the media, comprising:

setting a first threshold specifying a maximum number of consecutive successful transmissions by the network station interleaved with a first minimum delay interval;

setting a second threshold specifying a maximum number of consecutive successful transmissions by the network station interleaved with a second delay interval greater than the first minimum interval;

counting a number of consecutive successful transmissions of data packets by the network station; and selectively delaying transmission of another packet for one of the first and second delay intervals based on the counted number of consecutive successful transmissions and the first and second thresholds.

17. The method of claim 16, wherein the selectively delaying step comprises:

if the counted number is less than the first threshold, delaying transmission of the another packet for the first delay interval;

if the counter number exceeds the first threshold, delaying transmission of the another packet for the second delay interval; and if the counter number exceeds the second threshold, delaying transmission of the another packet for the first delay interval and resetting the counted number to zero.

18. The method of claim 16, wherein the selectively delaying step comprises delaying transmission of the another packet for the first delay interval and resetting the counted number to zero in response to a detected frame sent by another station on the network.

19. The method of claim 16, wherein the selectively enabling step comprises:

if the number of consecutive successful transmissions does not exceed the first threshold, selecting the first delay interval for delaying transmission of the another packet; and if the number of consecutive successful transmissions is between the first and second thresholds, selecting the second delay interval for delaying transmission of the another data packet.

20. The method of claim 19, wherein the selectively enabling step comprises, if the number of consecutive successful transmissions exceeds the second threshold, selecting the first delay interval and resetting the number of consecutive successful transmissions to zero.

21. A network interface for connection with media of a network, comprising:

a sensor sensing deassertion of a carrier on the media;

a programmable timer counting a programmable delay interval in response to the sensed deassertion of said carrier, the programmable delay interval having a value of at least a predetermined interpacket gap interval;

a transmitter outputting a data frame onto the media in response to a determined absence of activity by said sensor during the programmable delay interval;

a transmission burst counter configured to count consecutive transmissions of the data packets by the transmitter;

first and second registers storing first and second programmable thresholds, respectively; and a controller increasing the programmable delay interval from the predetermined interpacket gap interval in response to the transmission burst counter exceeding the first programmable threshold, wherein in response to the transmission burst counter exceeding the second programmable threshold the controller resets the transmission burst counter to zero and the programmable delay interval to the predetermined interpacket gap interval.

22. The interface of claim 21, wherein the controller resets the transmission burst counter to zero and the programmable delay interval to the predetermined interpacket gap interval in response to detection of another data frame successfully transmitted from another network station.

* * * * *